(12) United States Patent
Ujkashevic et al.

(10) Patent No.: US 10,507,796 B2
(45) Date of Patent: Dec. 17, 2019

(54) METHOD AND APPARATUS FOR WIRELESS VALET KEY CONFIGURATION AND RELAY

(71) Applicant: Ford Global Technologies, LLC, Dearborn, MI (US)

(72) Inventors: Desi Ujkashevic, Shelby Township, MI (US); Mohammed Samer Abbas, Dearborn Hts., MI (US); John P. Joyce, West Bloomfield, MI (US); Darrel Alan Recker, Ypsilanti, MI (US); Todd Allen Brown, Franklin, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/819,939

(22) Filed: Nov. 21, 2017

(65) Prior Publication Data

US 2019/0152435 A1 May 23, 2019

(51) Int. Cl.
*B60R 25/24* (2013.01)
*G06F 21/30* (2013.01)
*G06Q 50/30* (2012.01)

(52) U.S. Cl.
CPC .............. *B60R 25/24* (2013.01); *G06F 21/30* (2013.01); *G06Q 50/30* (2013.01); *B60R 2325/10* (2013.01); *B60R 2325/205* (2013.01)

(58) Field of Classification Search
CPC ............ G07C 9/00007; G07C 9/00309; B60R 25/24; B60R 25/2018
See application file for complete search history.

(56) References Cited

U.S. PATENT DOCUMENTS

| | | | |
|---|---|---|---|
| 8,089,339 B2 | 1/2012 | Mikan et al. | |
| 9,189,900 B1 | 11/2015 | Penilla et al. | |
| 9,288,637 B2 | 3/2016 | Moeller | |
| 9,365,188 B1* | 6/2016 | Penilla | B60R 25/2018 |
| 9,718,440 B2 | 8/2017 | Kim et al. | |
| 9,721,076 B2 | 8/2017 | Lowe | |

\* cited by examiner

*Primary Examiner* — Nabil H Syed
(74) *Attorney, Agent, or Firm* — Michael Spenner; Brooks Kushman P.C.

(57) ABSTRACT

A system includes a processor configured to receive a valet-key request from a valet mobile device. The processor is also configured to request authentication of a key transfer, responsive to the request and transfer, from an owner mobile device to the valet mobile device, vehicle data, describing a vehicle, and key data, usable to access and activate the vehicle, responsive to authentication approval.

15 Claims, 4 Drawing Sheets

METHOD AND APPARATUS FOR WIRELESS VALET KEY CONFIGURATION AND RELAY

TECHNICAL FIELD

The illustrative embodiments generally relate to methods and apparatuses for wireless valet key configuration and relay.

BACKGROUND

An inconvenience related to valet parking a vehicle is that a vehicle owner must turn over the keys for the vehicle. This can, in some cases, give a valet unfettered access to use the vehicle. Some solutions to this problem have been proposed that include, for example, setting a geo-fence when valet parking a vehicle, or limiting drive characteristics, speeds, ranges, etc. Unfortunately, these are all stop-gap solutions, and none addresses the need to turn a device over to the valet, a device that can be lost.

Ride sharing concepts and applications allow vehicles to be accessed by codes, so one alternative is to provide a valet with an access code. Of course, in this case the owner would still need to restrict access if desired, and the valet would have to keep track of a large number of access codes if many vehicles were so-equipped. Additionally, the owner would have to reconfigure an access code for each valet, or risk having an access code to the vehicle out in the ether.

SUMMARY

In a first illustrative embodiment, a system includes a processor configured to receive a valet-key request from a valet mobile device. The processor is also configured to request authentication of a key transfer, responsive to the request and transfer, from an owner mobile device to the valet mobile device, vehicle data, describing a vehicle, and key data, usable to access and activate the vehicle, responsive to authentication approval.

In a second illustrative embodiment, a system includes a mobile-device processor configured to wirelessly receive a plurality of data sets comprising key data and vehicle data for a plurality of vehicles, each set including the vehicle data identifying a particular vehicle and key data for accessing and activating the particular vehicle and transferred from another mobile device. The processor is also configured to display a selectable list of vehicles to which the data sets correspond and use the key data for a selected vehicle to cause a device including the processor to function as a key fob for the selected vehicle.

In a third illustrative embodiment, a computer-implemented method includes transferring vehicle identifying data, vehicle activation data and a use constraint, constraining at least vehicle use or activation data duration, from a first mobile device to a second mobile device, responsive to a transfer request received over a short range wireless protocol at the first mobile device from the second mobile device.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
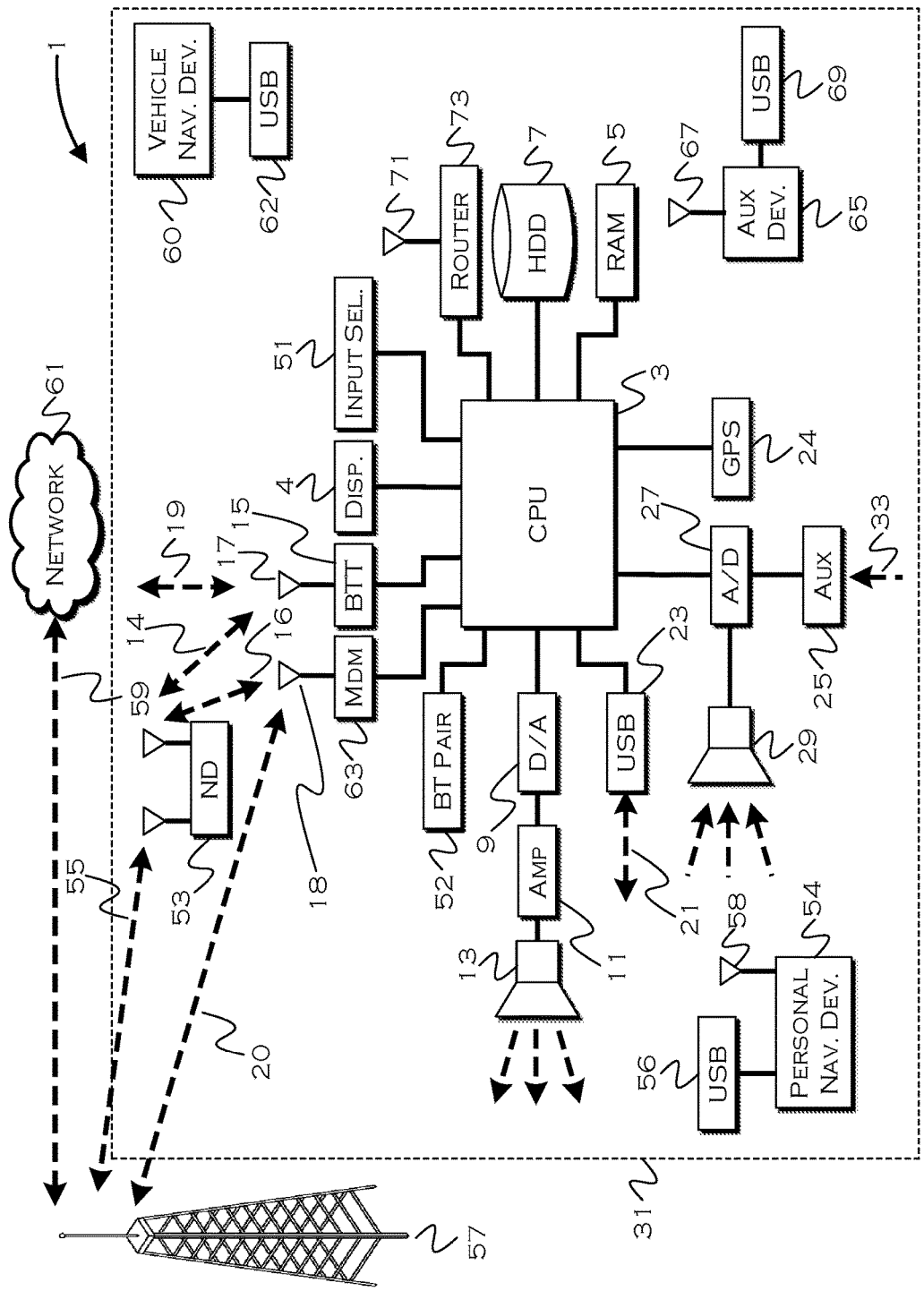
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

As vehicles and mobile devices, such as smartphones, become more advanced, consideration is being given to solutions that allow a driver to use a phone as a proxy for a key-fob, so that passive entry and passive start solutions (allowing touch-entry and touch-start) are enabled based on the presence of a phone. While this can prevent a user from having to carry a key, this still does not solve a valet sharing problem, because in this case the owner would have to actually give the valet the owner's phone.

In the illustrative embodiments, the above problem is solved by allowing the owner to share digital aspects of a temporary-use valet key. This can allow the owner to have a one-touch (or even automatic) option for sharing a valet key wirelessly, without any physical exchange of devices. Since the key can be enabled for limited use, parameters constraining valet usage can be attached to the key, and the key can simply expire (e.g., without limitation, the owner actually uses their own device to start the vehicle, a time period expires, the vehicle travels more than X distance from where valet was enabled, etc.).

Figure 2:
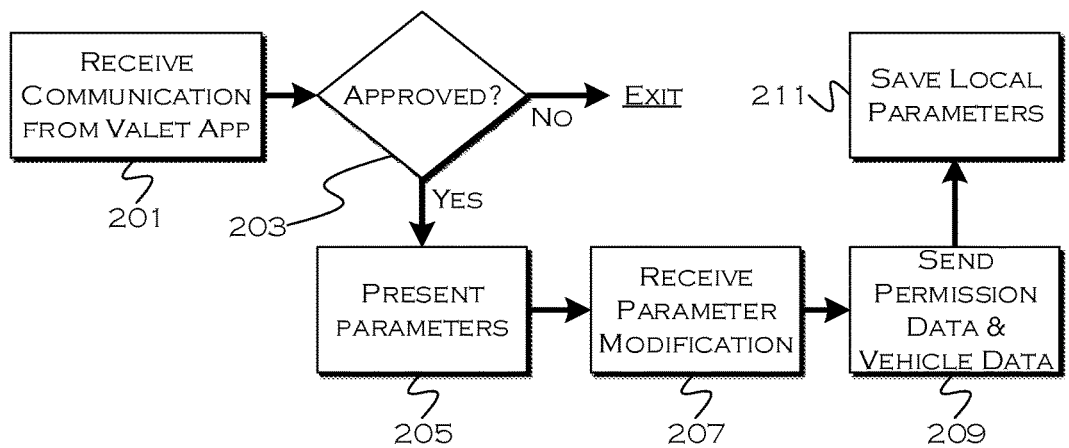
FIG. 2 shows an illustrative key-sharing process.

FIG. 2 shows an illustrative key-sharing process. In this illustrative example, the process running on a driver-side device or vehicle, receives 201 communication from a valet application. This can be an express request from the valet device or application, or can be in response to the valet application coming within a certain distance of a device or vehicle provided with a sharing application. If the driver-side device or vehicle approves 203 the request, the process presents the driver with a set of configurable parameters. These could be preconfigured, or these could be configured on each use by a driver. Initial values of the parameters could be set based on the location type, a calendar or email, or in any other suitable manner.

For example, a driver could have an email or calendar event specifying that the driver will be at a hotel for 2 days, or at a restaurant for 2 hours. When the vehicle arrives at the location, the process may "know" the expected stay, and set base duration parameters based on the location. The process may also configure a range based on the location type. In another example, the valet application may send a minimum range required to process valet parking, which could be used to accommodate unexpected distances for far-away parking lots and the like.

The process presents 205 the driver with a set of base parameters (unless the driver prefers default parameters preset or specified by the valet application as above). The process may also receive 207 any parameter modification from the driver (extensions or reductions of time, distance, max speeds, etc.) The process then sends 209 permission data and vehicle data to the valet application, and saves 211 the parameters locally. The locally saved parameters can act as a backup measure so that even if the valet parameters are hacked, the vehicle "knows" that no such changes are appropriate. This also avoids a situation where a key that fails to expire is still rendered usable.

With regards to the transmitted data, the process may send vehicle make, model, color, etc. The vehicle odometer reading may be sent and saved, and any other pertinent information may be included. Also, permission data for temporary entry and start (similar to a driver device-key) is transferred by the process. And, in some cases, where certain other requirements for engagement, such as "device-in-driver-seat" or "device within 2 meters of vehicle," etc. exist, the process may send these requirements, so that the valet key conforms to constraints set on the driver key, if desired.

Figure 3:
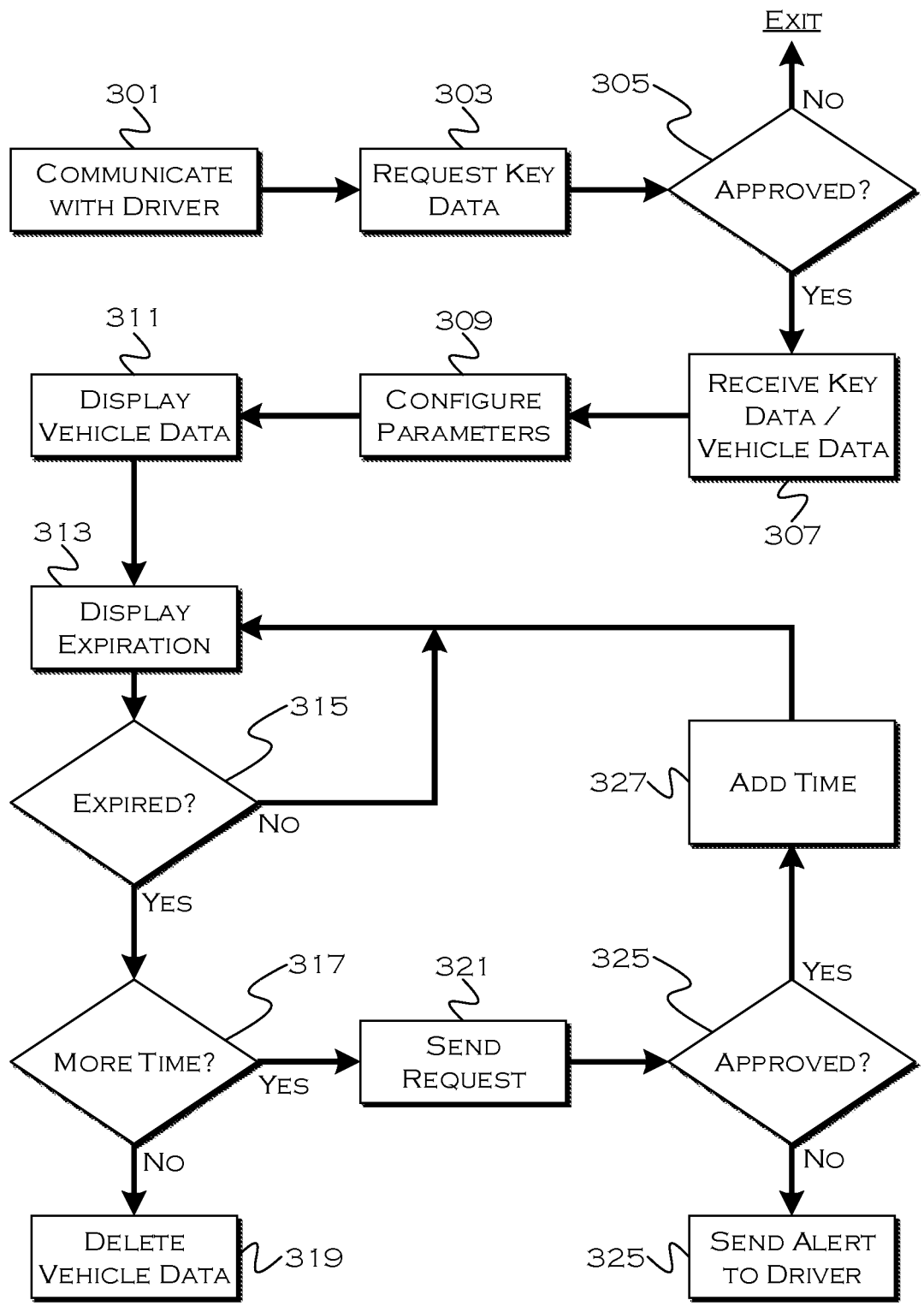
FIG. 3 shows an illustrative valet-side reception and display process.

FIG. 3 shows an illustrative valet-side reception and display process. In this example, the process communicates 301 with the driver side device or vehicle, requesting 303 key data from the driver. This can include communication based on proximity or other automatic functions, or expressly requested communication from a valet application. Valet companies can download and install a key-receiving application that can be provided to employee devices or devices kept for the purpose of acting as keys.

If the initial request is approved (i.e., if the driver intends to use the valet service), the process may receive 307 vehicle and key data. It is worth noting that multiple valet applications may be synchronized and share key data, so all valets have access to all keys, and/or the key data may be stored in the cloud or on a local server, and each valet device will pull the data as needed from the central storage. This may prevent a single valet device containing a key from stopping a different valet (who does not possess the device) from retrieving a vehicle. This may also accommodate shift-changes, especially if valets are using their own devices. A login or other authentication can provide a valet device application with all the current available keys.

The process receives the transmitted data and configures parameters 309 associated with a key. This can include, for example, a countdown clock for expiration and any use constraints placed on driving the vehicle. This is a behind-the-scenes configuration, but the valet may be shown the parameters in case an owner override to change a parameter is needed (i.e., speed is limited to 20 mph, but the valet must drive on a 40 mph road to reach a valet lot).

The valet-side process then displays 311 the vehicle data, which can include, for example, make and model, color, license plate, etc. This display may also include 313 an expiration countdown clock, so the valet knows when a key will expire. If the key expires 315 or approaches expiration, the process may ask the valet if more time is needed (i.e., has the customer retrieved the vehicle) 317.

If the valet requires more time, the process may send 321 a request to the driver device, asking for an extension of time. If the driver approves 323 the request for more time, the process may add 327 time to the expiration and continue to display the expiration. If the driver does not approve the additional time, the process may notify 325 the driver that the valet key is now disabled, which may require the driver to re-issue a new valet key upon leaving, if desired and if the driver is not simply retrieving their own vehicle. If the key expires and no more time is added, the process may delete 319 the key data saved on any valet devices and/or on any central valet servers. The driver may also be able to initiate such a delete instruction at any time, and if there is an automatic trigger for deletion (driver drives away from location, driver uses own-key, etc.) this may cause the deletion instruction to be sent to the valet device(s) and/or server.

Figure 4A:
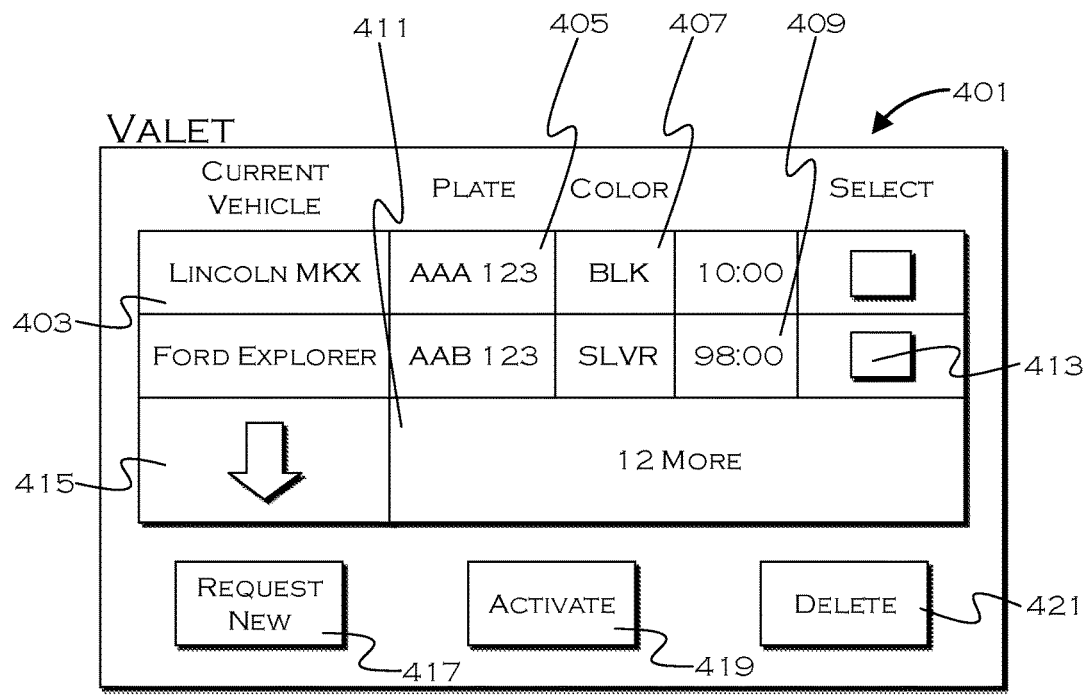
FIGS. 4A and 4B show illustrative displays from a valet (4A) and driver (4B) perspective.
Figure 4B:
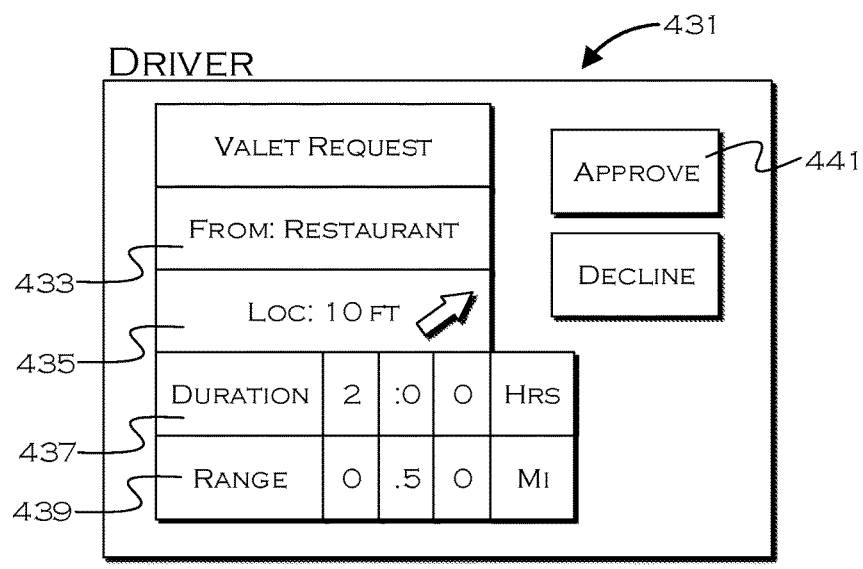

FIGS. 4A and 4B show illustrative displays from a valet (4A) and driver (4B) perspective. In FIG. 4A, a non-limiting example 401 of a valet-side application is shown. This includes, for example, a list of vehicles 403. Each vehicle may include a license plate number 405, a color 407 and a current time until expiration 409. Other characteristics may be added or removed as appropriate. The display also includes an option 413 for a valet to select a particular vehicle to which optional actions are to apply.

This illustrative display application also includes a scroll 415 option and a list 411 of how many additional vehicles are available. The display may further include some functionality, such as a button to send a request 417 for a new key download, a delete 421 button and one or more fob-control buttons 419.

In one example, the valet application causes the selected vehicle to respond to the presence of the device as a PEPS key, so that fob functions are not used, but selection of the activate 419 button may enable PEPS functions for the selected vehicle. In other examples, the application interface may include fob functions (trunk, remote start, remote unlock, etc.). These can be dynamically configured per vehicle, such that functions corresponding to actual possible vehicle functions appear or are enabled on a vehicle by vehicle basis.

FIG. 4B shows a non-limiting driver side application interface 431, which could exist on a driver mobile device (e.g., phone) or in a vehicle on a vehicle human machine interface (HMI). This interface includes a notification of a valet request, including, for example, an identifying 433 party. If the application requesting the key has a unique business identifier associated therewith, the driver can know that the request is associated with a current location where the vehicle is parked or sitting. The process may also include a location 435 of the requesting device or server, which can include a directional arrow. Both location and direction could be detected by various vehicle antenna/transceivers or other sensors, using data such as received signal strength indicator (RSSI).

The driver interface may also include, for example, a duration parameter 437 and a range parameter 439, as well as any other configurable parameters. In this example, the driver can scroll the parameter values to change the parameters to the desired values, if the default values are not suitable. If a minimum exists that was, for example, transmitted by a valet application, the process may block scrolling past that point or alert the driver and/or valet if the minimum is exceeded. For example, if a driver has a $150,000 vehicle, the driver may want the range limited to 0.05 miles, but the valet minimum may be 0.2 miles. The driver may work with the valet to set the lower minimum, knowing that the vehicle will thus be likely parked directly in front of the building. The interface also include options 441 for the driver to approve or decline the valet request.

Figure 5:
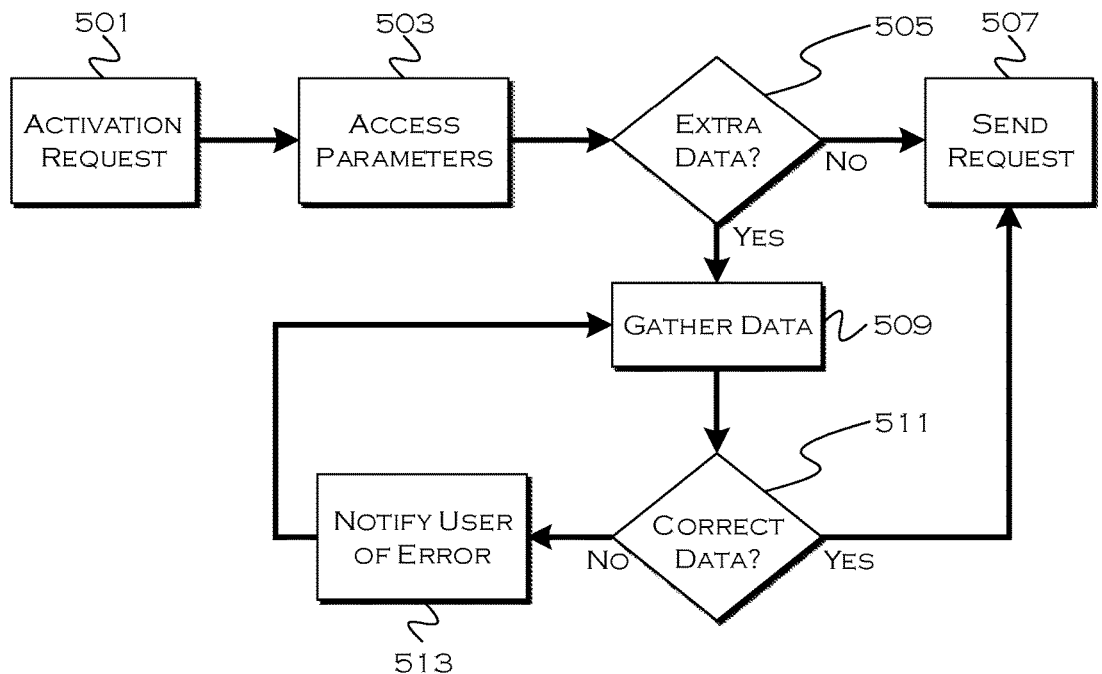
FIG. 5 shows an illustrative key utilization process.

FIG. 5 shows an illustrative key utilization process. In this example, the process receives 501 an activation request from a valet using the valet-side application. The process accesses 503 any parameters associated with the particular key (proximity, in-vehicle location, etc) to determine if any extra 505 data is required. For example, paranoid drivers may not want valet PEPS functions enabled for their vehicle until the valet is within 10 feet of the vehicle (even if this is not a "normal" key parameter), to prevent accidental enablement and access to that vehicle. These configurable parameters may dictate any additional data required for activation. In another example, the parameter may be, for example, an actual request sent to a driver device, requiring driver approval each time the key is used.

If there is no additional data required, the process executes 507 an activation request for the selected vehicle, enabling the valet device to act as a PEPS or other suitable key for purpose of accessing and starting the vehicle. If additional data is required, the process may gather 509 the additional data and determine if the gathered data meets 511 the required parameter settings. For example, the process may determine whether or not the valet is within 10 feet of the vehicle (to use the above parameter example) and if the data is not a match, the process may notify 513 the valet of any problem. For example, in the preceding example, the process may notify the valet "the device must be within 10 feet of a vehicle location in order to enable this key." There is also the possibility of limited functionality until a parameter is met, for example, the valet can use the device to chirp-locate or light-flash-locate the vehicle, at any time but unlock and start commands may not be enabled until the parameters are met.

Through use of the illustrative embodiments and the like, drivers have an option to provide on-demand keys to valet services that do not necessarily require any on-the-spot configuration or exchange of physical devices. These keys may also act to restrict travel and may eventually expire, addressing concerns about inappropriate vehicle usage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:
   receive a valet-key request from a valet application executing on a valet mobile device, automatically generated by the valet application in response to the valet application wirelessly detecting a sharing application on a user device including the processor;
   request authentication of a key transfer, responsive to the request; and
   transfer, via the sharing application, vehicle data, describing a vehicle, and key data, usable to access and activate the vehicle, responsive to authentication approval.

2. The system of claim 1, wherein the vehicle data includes a vehicle make or model.

3. The system of claim 1, wherein the vehicle data includes a vehicle color.

4. The system of claim 1, wherein the vehicle data includes a vehicle license plate number.

5. The system of claim 1, wherein the key data includes a set of vehicle fob-functions.

6. The system of claim 1, wherein the key data includes predefined parameters for using the key data.

7. The system of claim 1, wherein the processor is further configured to:
   present configurable use-constraints, responsive to the request, on a driver-accessible interface.

8. The system of claim 7, wherein the processor is configured to transfer use-constraints with the key data and vehicle data.

9. The system of claim 7, wherein the processor is configured to save a copy of the use-constraints onboard the vehicle, the use-constraints constraining use of the key data when accessing or activating a vehicle.

10. The system of claim 7, wherein the use-constraints include range.

11. The system of claim 7, wherein the use-constraints include key data duration.

12. The system of claim 1, wherein the user device is a mobile device.

13. The system of claim 1, wherein the user device is a vehicle.

14. A method comprising:
   receiving a valet-key request from a valet application executing on a valet mobile device, automatically generated by the valet application in response to the valet application wirelessly detecting a sharing application on a user device receiving the request;
   requesting authentication of a key transfer, responsive to the request; and
   transferring, via the sharing application, vehicle data, describing a vehicle, and key data, usable to access and activate the vehicle, responsive to authentication approval.

15. A non-transitory storage medium storing instructions that, when executed by a processor, cause the processor to perform a method comprising:
   receiving a valet-key request from a valet application executing on a valet mobile device, automatically generated by the valet application in response to the valet application wirelessly detecting a sharing application on a user device receiving the request;
   requesting authentication of a key transfer, responsive to the request; and
   transferring, via the sharing application, vehicle data, describing a vehicle, and key data, usable to access and activate the vehicle, responsive to authentication approval.

* * * * *